United States Patent
Deore et al.

(10) Patent No.: US 11,822,938 B2
(45) Date of Patent: Nov. 21, 2023

(54) USER PROFILE MIGRATION TO VIRTUAL DESKTOP INFRASTRUCTURE

(71) Applicant: VMware, Inc., Palo Alto, CA (US)

(72) Inventors: Charansing Deore, Pleasanton, CA (US); Sisimon Soman, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/990,557

(22) Filed: Nov. 18, 2022

(65) Prior Publication Data
US 2023/0077790 A1   Mar. 16, 2023

Related U.S. Application Data

(63) Continuation of application No. 16/657,919, filed on Oct. 18, 2019, now abandoned.

(51) Int. Cl.
| | |
|---|---|
| *G06F 9/445* | (2018.01) |
| *G06F 9/451* | (2018.01) |
| *G06F 9/455* | (2018.01) |
| *G06F 9/48* | (2006.01) |

(52) U.S. Cl.
CPC ............ *G06F 9/4451* (2013.01); *G06F 9/452* (2018.02); *G06F 9/45558* (2013.01); *G06F 9/4875* (2013.01); *G06F 2009/4557* (2013.01); *G06F 2009/45595* (2013.01)

(58) Field of Classification Search
CPC .... G06F 9/4451; G06F 9/452; G06F 9/45558; G06F 9/4875; G06F 2009/4557; G06F 2009/45595
See application file for complete search history.

(56) References Cited

U.S. PATENT DOCUMENTS

| | | | | |
|---|---|---|---|---|
| 8,904,081 | B1* | 12/2014 | Kulkarni | G06F 3/0608 718/1 |
| 9,069,607 | B1* | 6/2015 | Gopalakrishna Alevoor | G06F 9/45558 |
| 9,542,209 | B2 | 1/2017 | Davis et al. | |
| 9,785,478 | B1* | 10/2017 | Babu B R | H04L 67/10 |
| 10,530,935 | B1* | 1/2020 | Britt | H04M 7/0084 |
| 2005/0097506 | A1* | 5/2005 | Heumesser | G07C 1/10 717/102 |
| 2009/0216975 | A1* | 8/2009 | Halperin | H04L 63/10 718/1 |
| 2015/0281322 | A1* | 10/2015 | Dingwell | G06F 21/00 715/740 |
| 2015/0319222 | A1* | 11/2015 | Zamir | G06F 9/4856 709/217 |

(Continued)

*Primary Examiner* — Philip C Lee
(74) *Attorney, Agent, or Firm* — Kim & Stewart LLP (57) ABSTRACT

A method of migrating a user profile to a virtual desktop infrastructure (VDI) system includes enumerating applications installed at an endpoint of a user, retrieving a list of application settings files, determining file and registry locations of user profile data relating to the applications installed at the endpoint from the application settings files, and retrieving the user profile data from the determined file and registry locations and storing the user profile data in a shared storage. When a user logs in to a virtual desktop of the VDI system, the user profile data is retrieved from the shared storage and imported into file and registry locations specified by the application settings files of applications that are installed in the virtual desktop.

20 Claims, 10 Drawing Sheets

(56) References Cited

U.S. PATENT DOCUMENTS

2016/0371104 A1* 12/2016 Zamir ................. G06F 9/45533
2016/0373523 A1* 12/2016 Kim ...................... H04L 67/303
2016/0378535 A1* 12/2016 Oh ........................ G06F 9/4451
                                                              718/1
2017/0373853 A1    12/2017 Soman

* cited by examiner

```
# This Flex config file references the built-in Microsoft Notepad application template.

# DirectFlex is configured and enabled (on the DirectFlex tab) to import personal settings
# when Notepad is launched and to export settings when it is closed.

[Metadata]
ProcessIfExists=
DirectFlexEnabled
DirectFlexPath=Notepad.exe
ProcessCriteria=<pc II='0' t='3' f='0' />

[BinarySettings]
UzBLfmRkMFU4SCRFMVQnezVaLks7Wj5hU2NSYIJqWGt6ejdePU8gUzxaLg5AL1s+Ti9LTk5RURISE
UQYSyRCNkEgUjdrJk8sXjFCLUs/Yy1CNlMjQiYmJiYmJiY8EiRY

[Immidio Flex]
This file was created using VMware UEM Management Console version 8.6.
Use only with VMware UEM.
```

USER PROFILE MIGRATION TO VIRTUAL DESKTOP INFRASTRUCTURE

CROSS-REFERENCE TO RELATED APPLICATIONS

This application is a continuation of U.S. patent application Ser. No. 16/657,919, filed Oct. 18, 2019, which is incorporated by reference herein.

BACKGROUND

In a virtual desktop infrastructure (VDI), desktops are hosted on virtual machines with an operating system (OS), such as Microsoft Windows®, and not on an endpoint device of a user. The desktop image is delivered over a network to the endpoint device, which allows the user to interact with the OS and its applications as if they were running locally on his/her endpoint device. The endpoint device may be a traditional personal computer (PC), a thin client, or a mobile device.

VDI has many benefits. One benefit is that since little actual computing takes place at the endpoint device, an information technology (IT) administrator may be able to extend the lifespan of otherwise obsolete PCs by repurposing them as VDI client devices. Further, when the time comes to purchase new devices, companies can buy cheaper, less powerful computers. There is also a security benefit in that user data resides in a data center in which VDI is deployed and thus is not compromised if someone steals the endpoint device.

When migrating desktops to VDI, one of the challenges is migration of existing user profiles. For example, in VMware's VDI products known as Horizon® View along with VMware AppVolumes, user profiles are stored in virtual disks known as writable volumes. In addition to profile data, a user's writable volume may store the user's installed applications. When the desktops of Horizon® View are upgraded to a new version of an OS, new writable volumes are created for the new version of the OS, and in most of these situations, an IT administrator may have to drop using old profiles and create new profiles, as a result of which all user settings are lost.

In addition, migrating user profiles from a desktop hosted on a physical machine to VDI and between different VDI systems can be error prone and poses challenges that could introduce issues post-upgrade if not properly addressed.

SUMMARY

One or more embodiments provide a method of migrating a user profile to a VDI system. A method of migrating a user profile to a VDI system includes enumerating applications installed at an endpoint of a user, retrieving a list of application settings files, determining file and registry locations of user profile data relating to the applications installed at the endpoint from the application settings files, and retrieving the user profile data from the determined file and registry locations and storing the user profile data in a shared storage. When a user logs in to a virtual desktop of the VDI system, the user profile data is retrieved from the shared storage and imported into file and registry locations specified by the application settings files of applications that are installed in the virtual desktop.

Further embodiments include, without limitation, a non-transitory computer-readable storage medium that includes instructions for a processor to carry out the above method, and a computer system that includes a processor programmed to carry out the above method.

DETAILED DESCRIPTION

Figure 1:
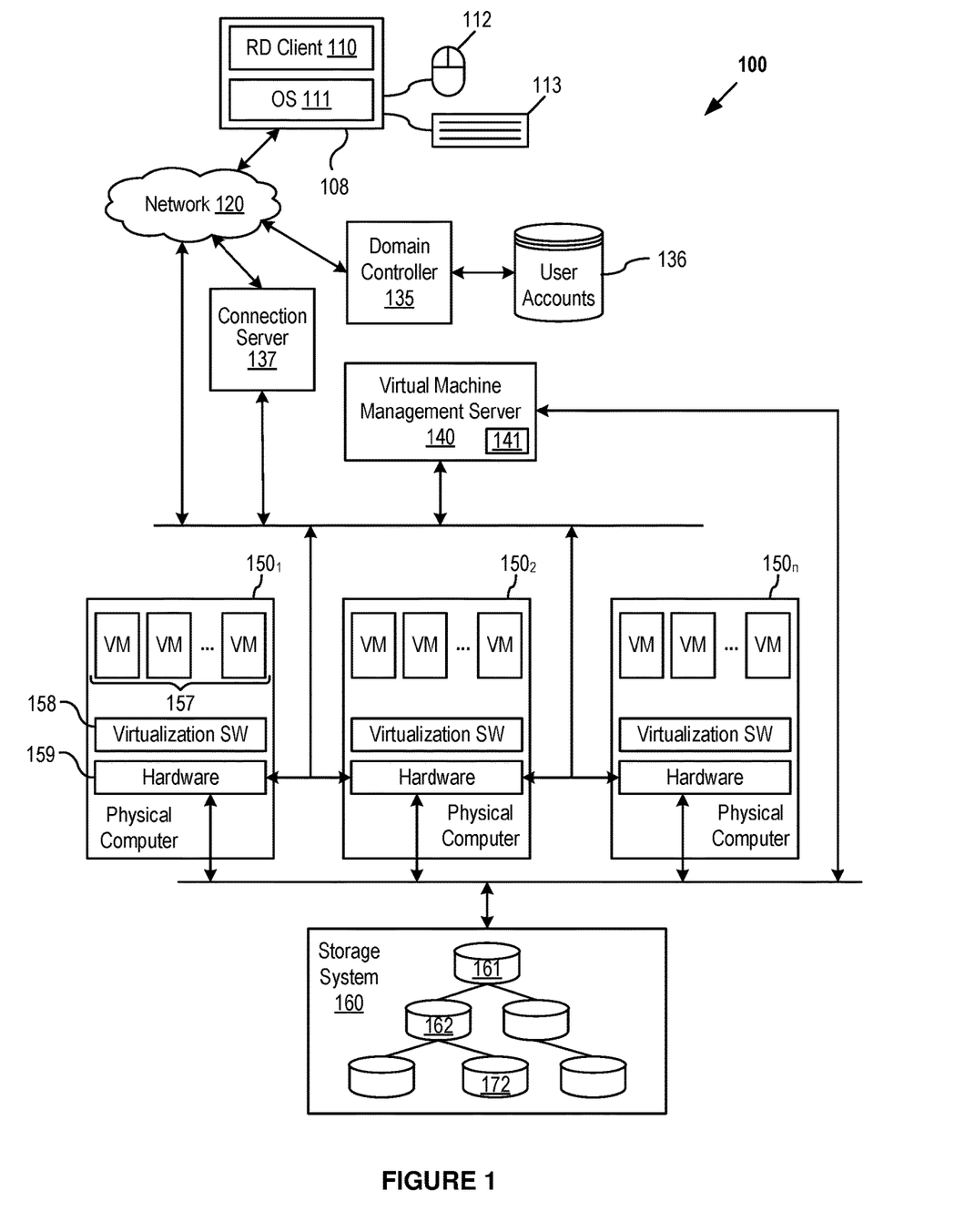
FIG. 1 is a block diagram of elements of a VDI system in which one or more embodiments may be implemented.

FIG. 1 illustrates components of a VDI system 100 (also referred to as a remote desktop computer system) in which one or more embodiments may be implemented. In VDI system 100, remote desktop client software programs (also referred to as "RD clients" for short) run on operating systems of local computing devices. In the embodiment illustrated in FIG. 1, RD client 110 runs on top of operating system (OS) 111 of client device 108. In addition, client device 108 has attached thereto a set of input devices including a mouse 112 and a keyboard 113. Alternatively or additionally, client device 108 may employ a touchscreen as an input device.

RD clients 110 provide an interface for the users to access their desktops, which may be running in one of virtual machines 157 or blade server (not shown) in a data center that is remote from the user locations. The term, "desktop" refers to the instance of an interactive operating environment provided by a computer operating system and software applications, typically in the form of a display and sound output and keyboard and mouse input. With RD clients 110, users can access desktops running in a remote data center through network 120, from any location, using a general purpose computer running a commodity operating system and a RD client software program such as Horizon® View, or a special purpose thin client such as those available from Dell, HP, NEC, Sun Microsystems, Wyse, and others.

VDI system 100 includes a domain controller 135, such as Microsoft Active Directory®, that manages user accounts 136 including user log-in information, and a connection server 137 that manages connections between RD clients and desktops running in virtual machines 157 or other platforms. Domain controller 135 and connection server 137 may run on separate servers or in separate virtual machines running on the same server or different servers. In the embodiments illustrated herein, remote desktops are running in virtual machines 157 and virtual machines 157 are instantiated on a plurality of physical computers 150₁, 150₂, . . . , 150n, each of which includes a hypervisor 158 (more generally, "virtualization software layer") and a hardware platform 159, is controlled by a virtual machine management server 140, and is coupled to a shared persistent storage system 160.

Virtual machine management server 140 includes a user environment management (UEM) console 141 that communicates with UEM agents running in client devices 108 to manage user profiles in the manner described in U.S. application Ser. No. 15/194,423, "Managing User Profiles Securely in a User Environment," filed on Jun. 27, 2016, the entire contents of which are incorporated by reference herein.

Virtual disks for virtual machines 157 are stored in storage system 160 as files managed by hypervisor 158. In one embodiment, a virtual disk for any one of virtual machines includes a base disk 161 that is shared by all virtual machines 157 and one or more delta disks. In the example given in FIG. 1, it is assumed that the virtual disk of one of VMs 157 (hereinafter referred to simply as VM 157) includes base disk 161, a first delta disk 162, and a second delta disk 172. Hereinafter, first delta disk 162 is referred to as an application volume and second delta disk 172 is referred to as a writable volume. An application volume is provisioned for applications installed in VM 157 and contains everything needed to run the applications, such as executables and registry keys. A writable volume contains data specific to a particular user such as application settings and user profile.

A particular configuration of the virtualized desktop infrastructure is described above and illustrated in FIG. 1, but it should be recognized that one or more embodiments may be practiced with other configurations of the virtualized desktop infrastructure.

Figure 2A:
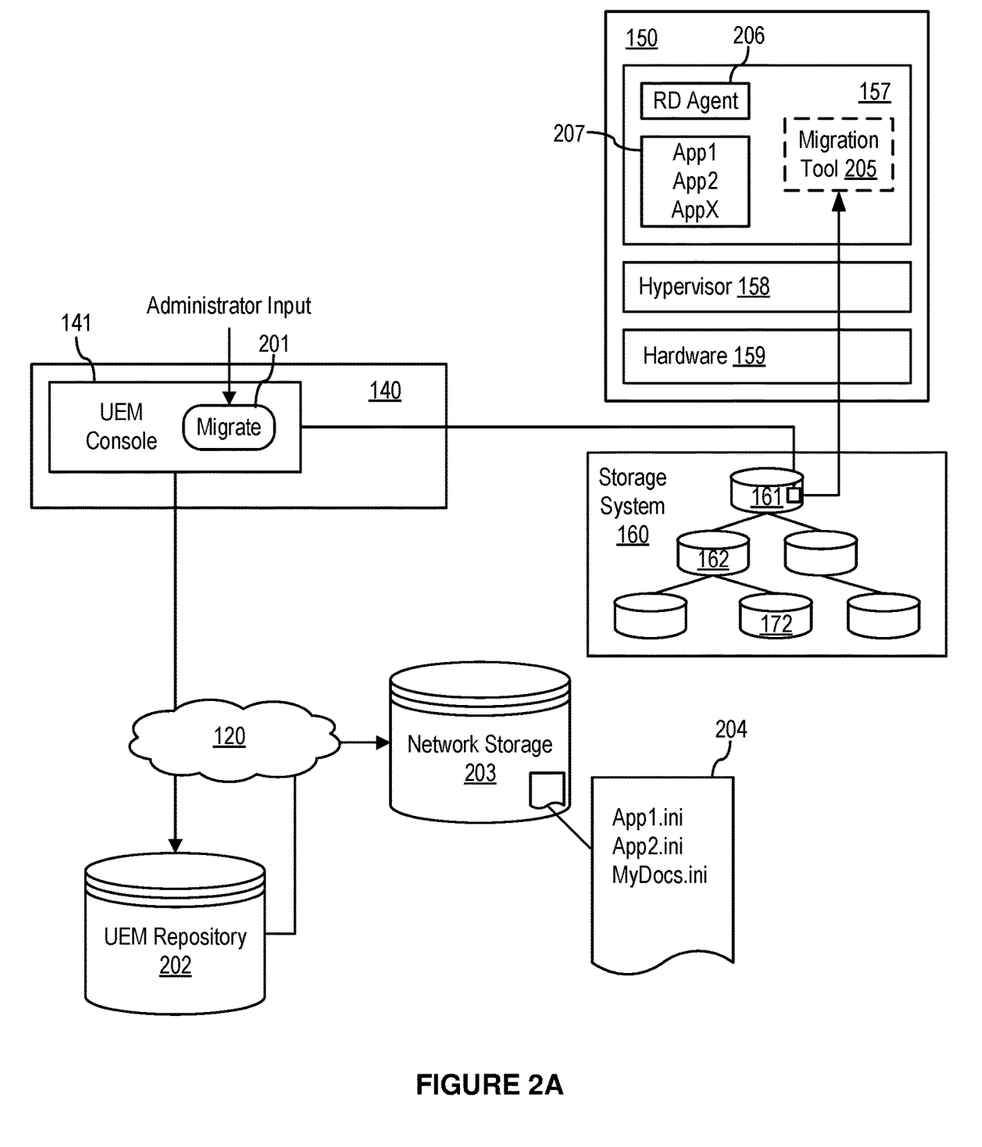
FIGS. 2A, 2B, and 2C are conceptual diagrams each illustrating different stages of a user profile migration process according to one or more embodiments.

FIG. 2A is a conceptual diagram that illustrates a first process of preparing for user profile migration according to one or more embodiments. In the example illustrated herein, components of VDI system 100 are prepared for user profile migration to a new VDI system. However, the general concepts described below are just as applicable to the following user profile migration cases: (1) migration from physical endpoints to VDI; (2) migration between VDI systems of different vendors; (3) migration of roaming user profiles to VDI; and (4) migration of user profiles after upgrades.

The components shown in FIG. 2A include UEM console 141 running in virtual machine management server 140, a migrate button 201 that is displayed on UEM console 141, and a UEM repository 202 that stores well-tested and fine-tuned settings files for a number of different common applications. These settings files contain control data that is used in backing up user-specific data and user-defined settings that are stored in registry and files of these individual applications. The components shown in FIG. 2A further include a network storage 203 in which settings files retrieved from UEM repository 202 and an archive of user-specific data and user-defined settings are stored temporarily prior to migration, and a migration tool 205 that is added to base disk 161, so that when a user logs in to his or her virtual desktop, virtual machine 157 that is hosting the virtual desktop will be instantiated with migration tool 205 installed therein.

FIG. 2A further illustrates a remote desktop (RD) agent 206 and a plurality of applications 207 (identified as App1, App2, and AppX) running in virtual machine 157. These components do not play a role during the process conceptually illustrated in FIG. 2A but do play a role during the processes conceptually illustrated in FIG. 2B and FIG. 2C.

The process of FIG. 2A begins when an administrator clicks on migrate button 201. In response, all known application setting files (e.g., INI files) will be retrieved from UEM repository 202 into network storage 203. Once retrieved, all of these settings will be configured in network storage 203 for all users whose profiles are to be migrated. During configuration administrators may choose to select or ignore certain application settings to migrate. The INI files for such applications are copied into network storage 203 in a known folder so that UEM console 141 can use it during the migration. In addition to retrieving the settings files and configuring the settings therein, UEM console 141 auto-configures other settings, such as OS settings and common user folders such as "My Documents," that are typically part of a user's profile. In FIG. 2A, the examples of settings files 204 are App1.ini (corresponding to App1), App2.ini (corresponding to App2), and MyDocs.ini (corresponding to settings for "My Documents" folder). In the example given herein, there is no settings file corresponding to AppX because it is not a common application and, as such, settings file for AppX did not exist in UEM repository 202.

UEM console 141 also installs migration tool 205 in base disk 161. As will be described below in conjunction with FIG. 2B, when a user logs in to his or her virtual desktop when base disk 161 contains an image of migration tool 205, virtual machine 157 that is hosting the virtual desktop will be instantiated with migration tool 205 installed therein.

The final step in the process of FIG. 2A is a notification to all users that user profile migration will be carried out for a specified period of time. The users are simply required to login during this period at least once to have their user profiles migrated. Further details of the process of FIG. 2A are described below in conjunction with FIG. 4.

Figure 2B:
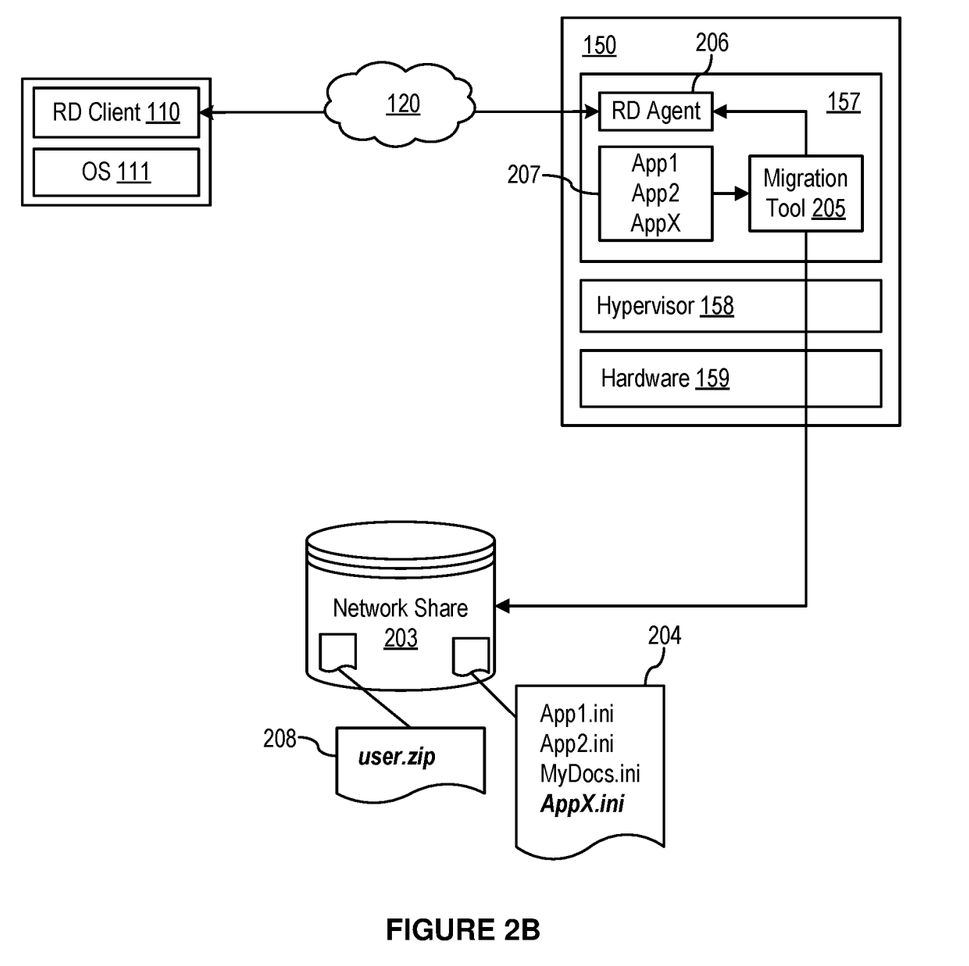

FIG. 2B is a conceptual diagram that illustrates a second process of preparing for user profile migration according to one or more embodiments. The process of FIG. 2B begins when a user logs in to his or her virtual desktop. In response to the user login, virtual machine 157 is instantiated and migration tool 205 is automatically started to enumerate all applications installed in virtual machine 157 and ensure that settings files are created for each of the applications installed in virtual machine 157. This process is further detailed in conjunction with FIG. 5 and FIG. 6.

After settings files have been created for each of the applications installed in virtual machine 157 including the one for AppX, and the user logs off, migration tool 205 executes export action for all user-specific data and user-defined settings including those of applications 207, the OS, and "My Documents" folder. All of the user-specific data and user-defined settings are then zipped up and saved to network storage 203 as a user profile archive 208 (with the file name "user.zip").

Figure 2C:
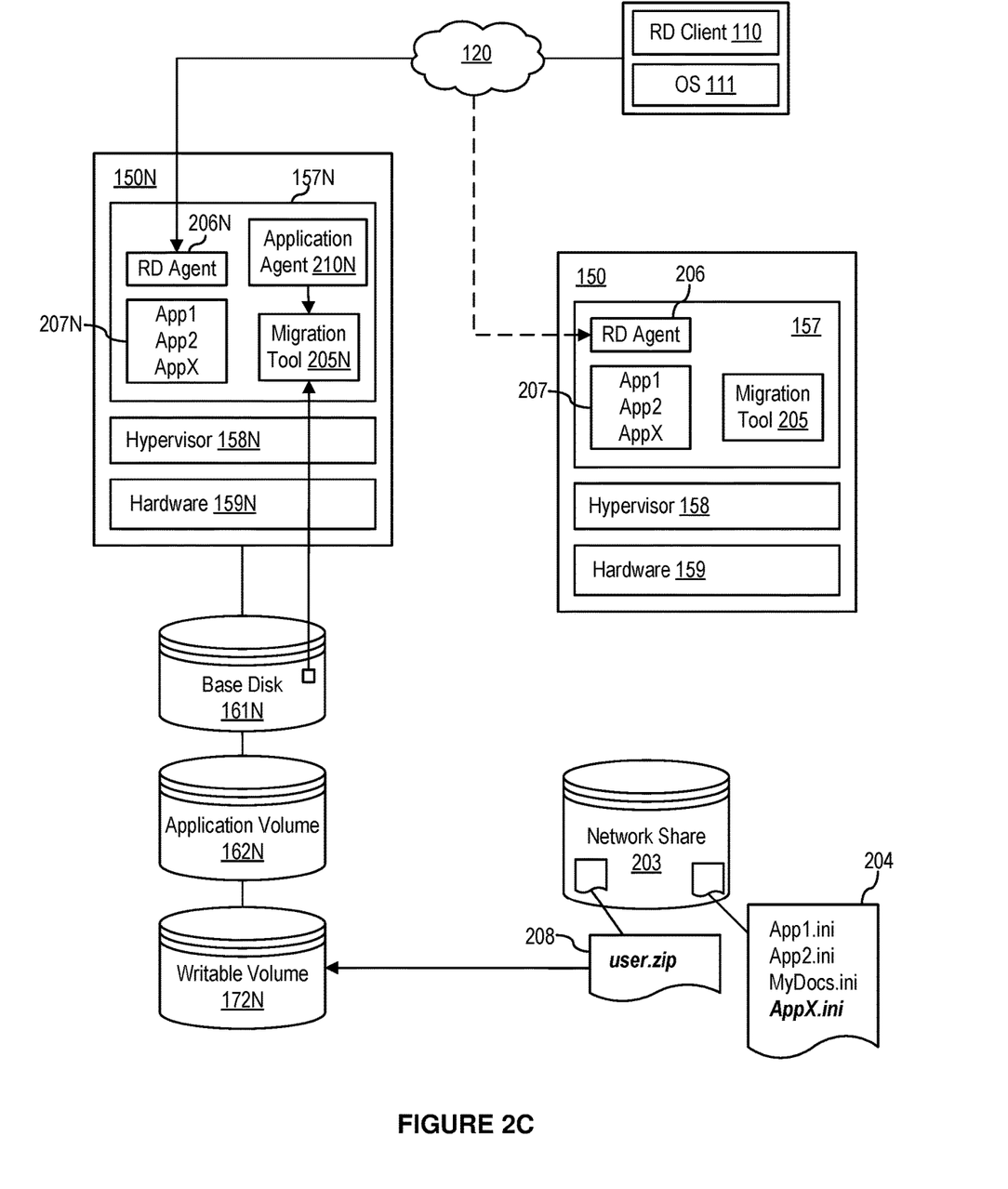

FIG. 2C is a conceptual diagram that illustrates a process of migrating the user profile to a new VDI system according to one or more embodiments. In FIG. 2C, a virtual machine 157N that is hosting the virtual desktop of the user whose user profile is being migrated is depicted. Virtual machine 157N is instantiated in a physical computer 150N, which includes a hypervisor 158N and a hardware platform 159N. The virtual disk for virtual machine 157N includes base disk 161N, an application volume 162N, and a writable volume 172N.

The process of FIG. 2C begins when the user logs in to his or her virtual desktop in the new VDI system. Upon login, an application agent 210N running in virtual machine 157N receives the login notification and, in response to thereto, mounts application volume 162N and writable volume

172N. Then, the OS of virtual machine 157N creates a new user profile on writable volume 172N.

After the new user profile is created, application agent 210N launches migration tool 205N in restore mode, which executes import action for all user-specific data and user-defined settings including those of applications 207, the OS, and "My Documents" folder, which are saved in user profile archive 208 (with the file name "user.zip"). After successful restore, migration tool 205N will disable itself such that it will not launch again on subsequent login. On subsequent login, all user-specific data and user-defined settings will be available in writable volume 172N. Further details of this process are described in conjunction with FIG. 7 and FIG. 8.

Figure 3:
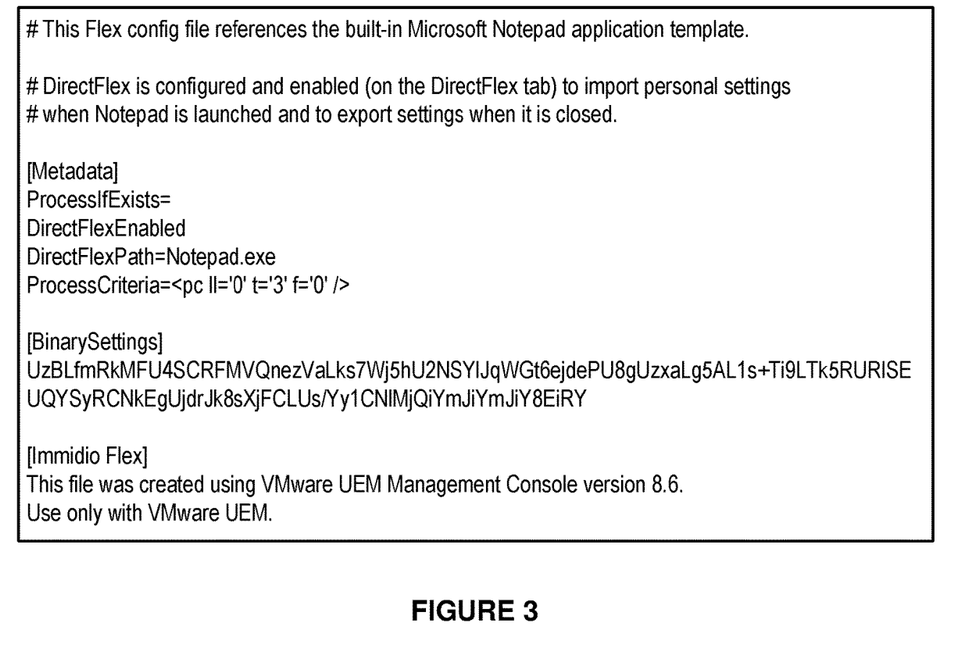
FIG. 3 is a sample application settings file.

FIG. 3 illustrates contents of one example of a settings file. The settings file includes a "BinarySettings" section, in which file and registry locations of user-specific data and user-defined settings are encoded. The settings file are common for all users, and contain only file and registry locations. They do not contain data or settings specific to any one user. Each time an application is launched, the application reads the settings file to determine the file and registry locations, and the application is opened with user-specific data and user-defined settings applied.

Migration tool IT Administrators typically run a profiler tool from UEM to monitor and list the paths in which an application being profiled on an endpoint stores its settings, in cases where a *.ini file does not exist for an application. The profiler tool in turn creates a settings file for the application, which the administrators can later edit and fine tune.

Figure 4:
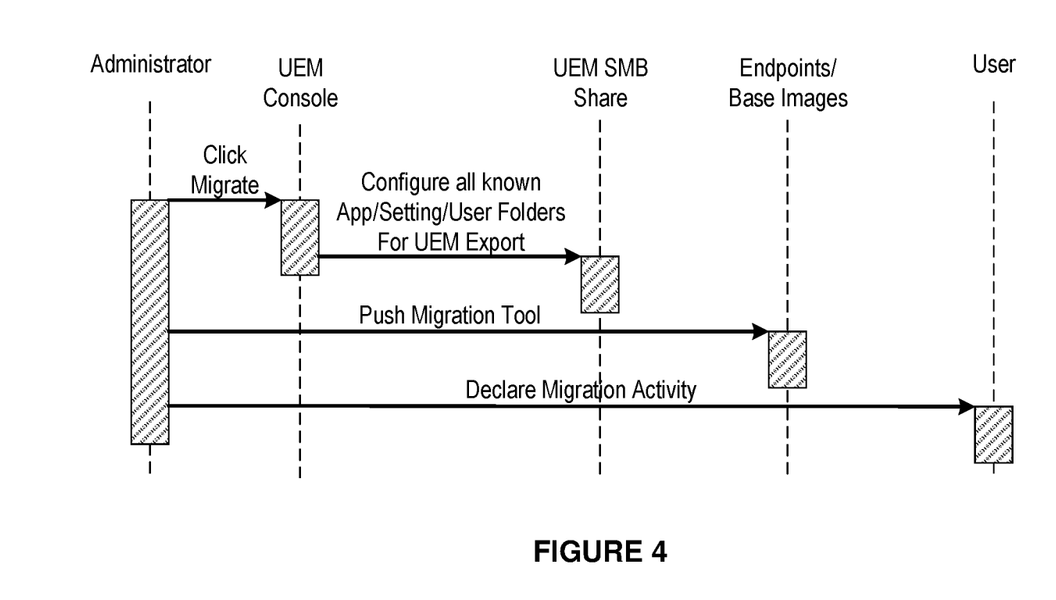
FIG. 4 is a sequence diagram illustrating a first migration preparation process according to one or more embodiments.

A first process 300 of user profile migration according to one or more embodiments, is explained below with reference to FIG. 4. In this example, a user profile is migrated from a physical endpoint device to a VDI system or migrated between different types of VDI systems. The first process 300 involves the use of a migration tool (e.g., migration tool 205) installed at the physical endpoint device or a virtual machine hosting a virtual desktop. Hereinafter, the physical endpoint device and the virtual machine hosting the virtual desktop will be referred to simply as an "endpoint."

When an administrator clicks on a "migrate" button (e.g., migrate button 201) on a user interface of UEM console 141, all of the known application setting files are retrieved into a network storage (e.g., network storage 203) and configured. Thereafter, UEM console 141 pushes out the migration tool to the physical endpoint device or to the base disk of the virtual disk that is provisioned for the virtual machine hosting the virtual desktop. The administrator then declares initiation of migration activity. The declaration of initiation of migration activity may be by way of an email, text message, or some other type of notification sent to all users for whom their user profiles are to be migrated to a new VDI system. By way of example, the declaration may indicate that migration activity will be carried out for a period of 7 days, or for a period of one month after a particular start date. During the migration activity period, each user is instructed to login to their endpoint device or virtual desktop at least once, in order that the user profile information may be collected and stored in the network storage as will be further described below.

After the first process has completed, a second process of user profile migration according to one or more embodiments, is carried out. The second process of the user profile migration will be explained below with reference to FIG. 5 and FIG. 6.

Figure 5:
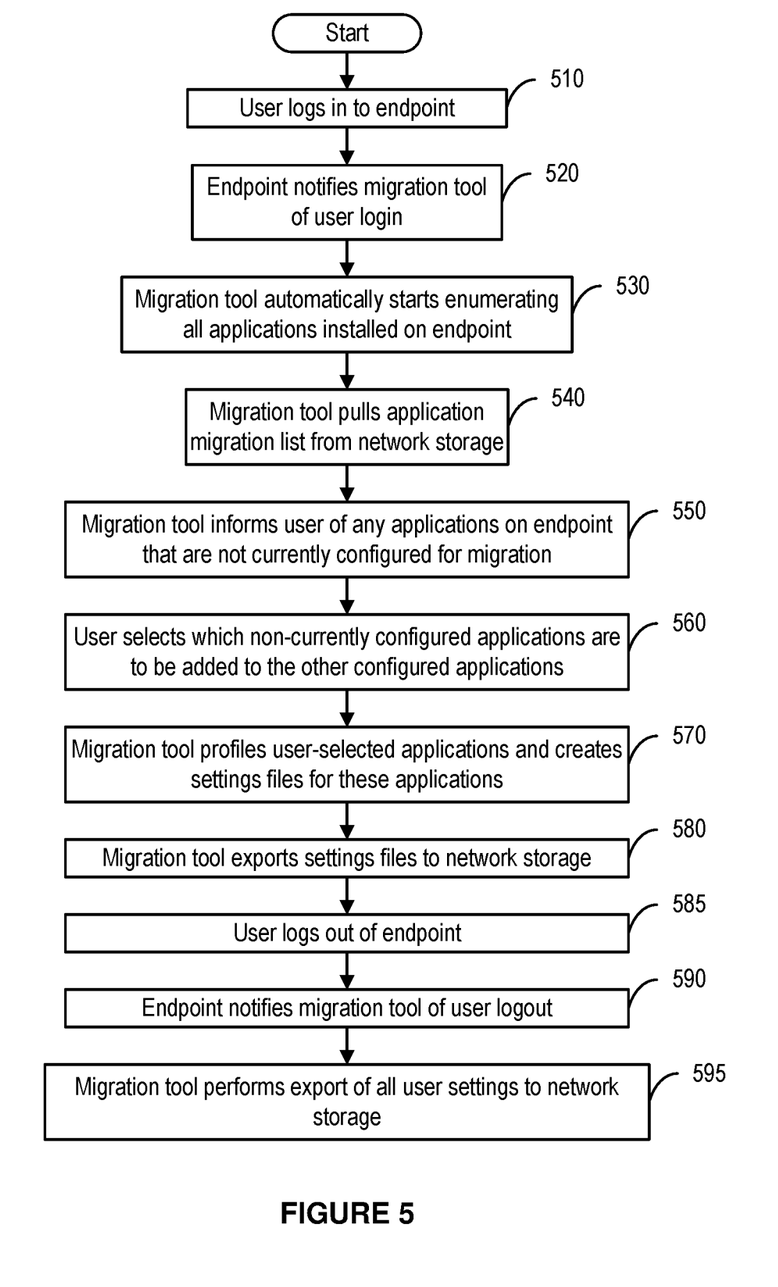
FIG. 5 is a flow diagram illustrating steps of a second migration preparation process according to one or more embodiments.
Figure 6:
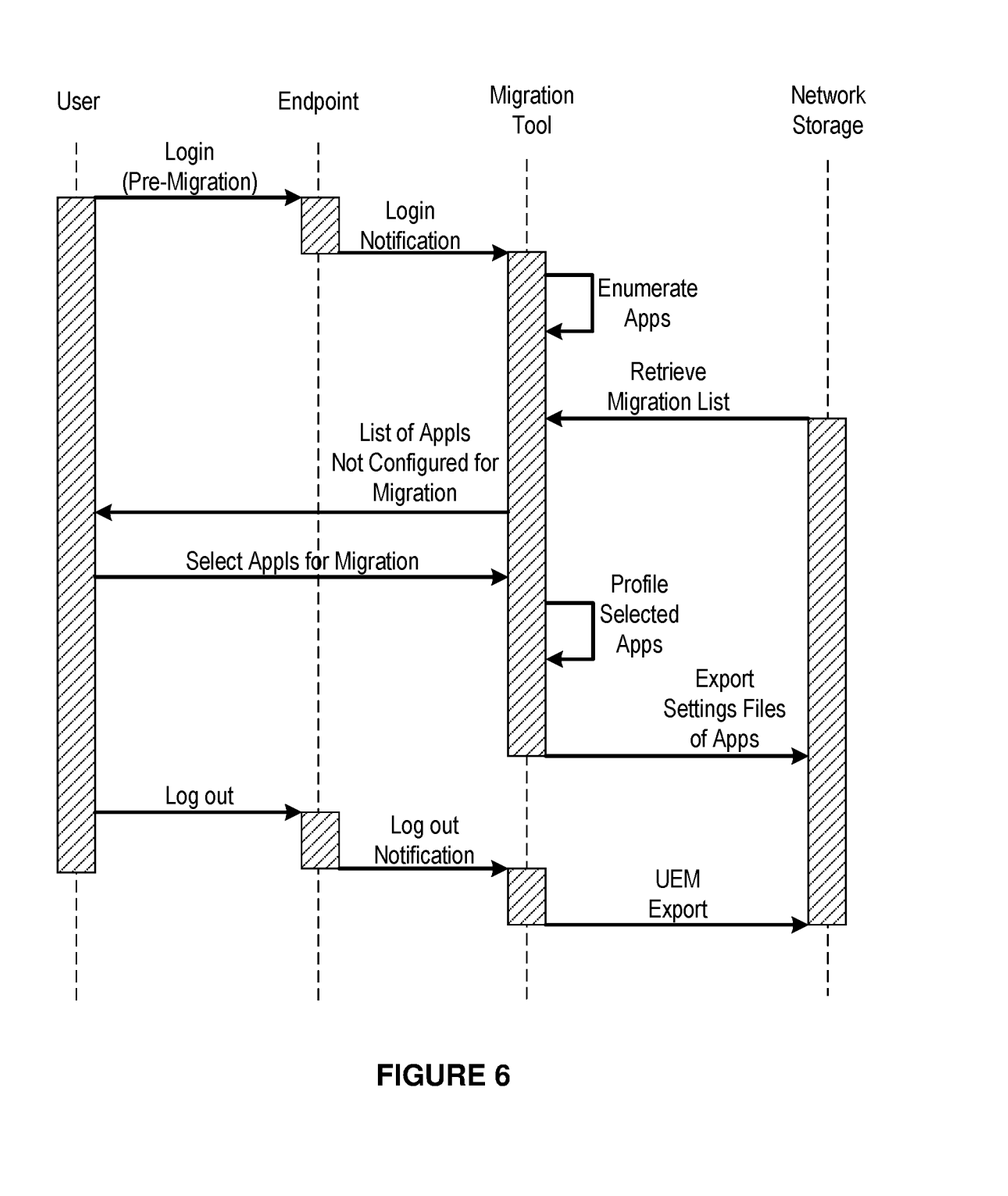
FIG. 6 is a sequence diagram illustrating the second migration preparation process according to one or more embodiments.

A user logs in to his or her endpoint in step 510. The endpoint notifies the migration tool of the user login in step 520. Migration tool, in response to the notification of the user login, automatically start a process of enumerating all of the applications installed on the endpoint (step 530).

Migration tool pulls a list of applications with a corresponding settings file from the network storage in step 540. Based on the list of applications and the enumerated applications on the endpoint as obtained in step 530, the migration tool informs the user in step 550 of any applications on the endpoint that are not currently configured for migration. The user selects, in step 560, which of the applications that are not currently configured for migration, to be configured for migration.

In step 570, the migration tool profiles the user-selected applications and generates the settings files for these applications. The settings file for an application may be obtained, for example, by using a profiler tool which upon opening of the application, collects information associated with all file system storage locations and registries accessed by the application on the endpoint, and in which an *.ini file is created by the profiler tool for the application. In some implementations, the profiler tool is run as a background process by the migration tool, which opens applications on the endpoint one by one, collects the settings metadata associated with each application, and then closes each application.

The migration tool exports to the network storage in step 580, after having obtained settings files in step 570 by the profiler tool for all applications selected by the user in step 560. In more detail, the settings files for the new applications obtained by profiler tool are uploaded to the network storage, and configured.

The user logs out of the endpoint in step 585, and the endpoint notifies the migration tool in step 590 of the user logout. The migration tool then performs, in step 595, retrieval of all user-specific data and user-defined settings from the file and registry locations determined from the corresponding settings files of the installed applications and other settings files and export of all such user-specific data and user-defined settings to the network storage as a zip file.

Users may login multiple times during the migration activity period declared by the administrator. During each login, steps of FIG. 5 will be repeated. As such, if the user has made any changes during any login session, including the most recent one, the updated files/settings will be backed up by the migration tool, thereby allowing the user to migrate the most recent files and settings.

After the profile backup process has been completed for each user who is to have their user profile migrated to the new VDI system, a third process of the user profile migration according to one or more embodiments, is performed. The third process of the user profile migration will be described with reference to FIG. 7 and FIG. 8 in detail below.

Figure 7:
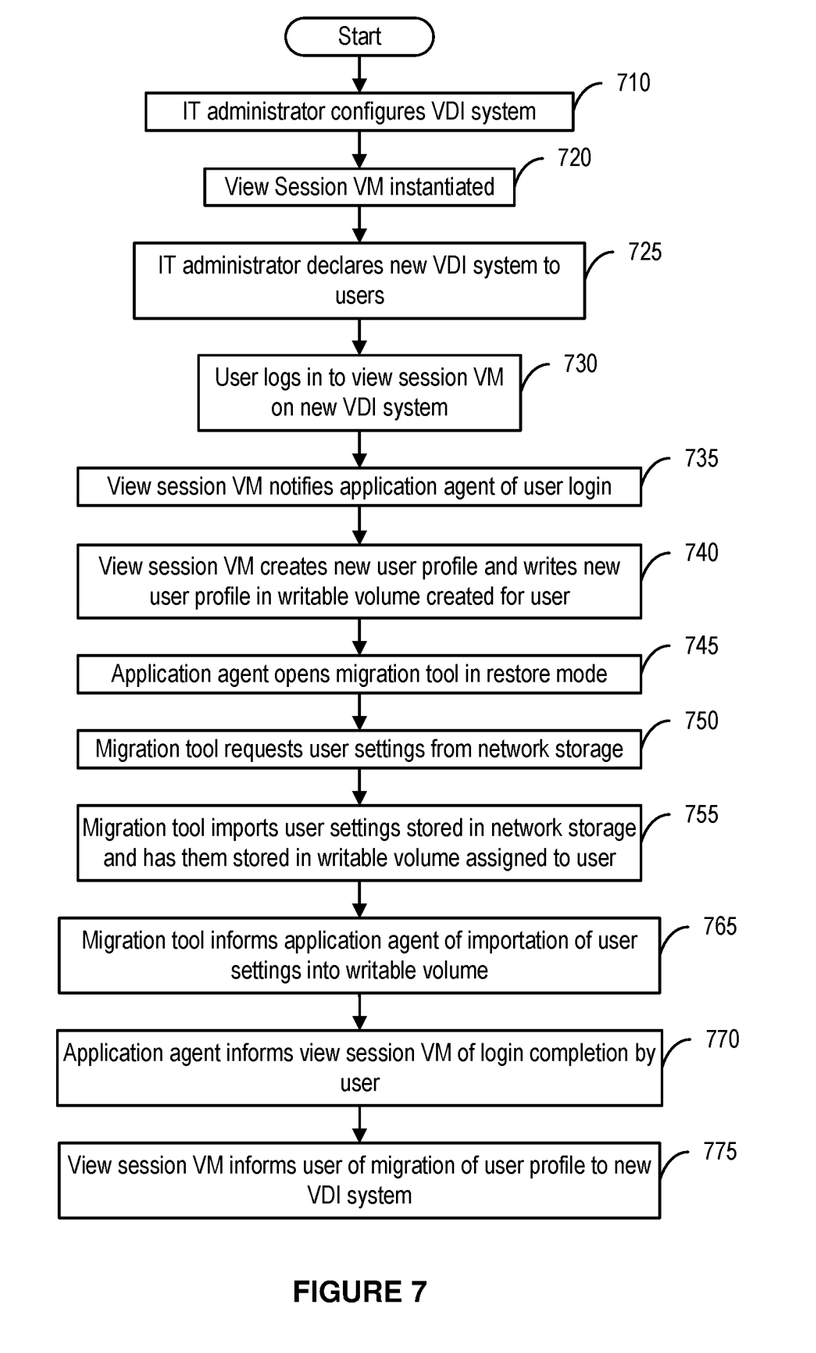
FIG. 7 is a flow diagram illustrating steps of a user profile restore process according to one or more embodiments.
Figure 8:
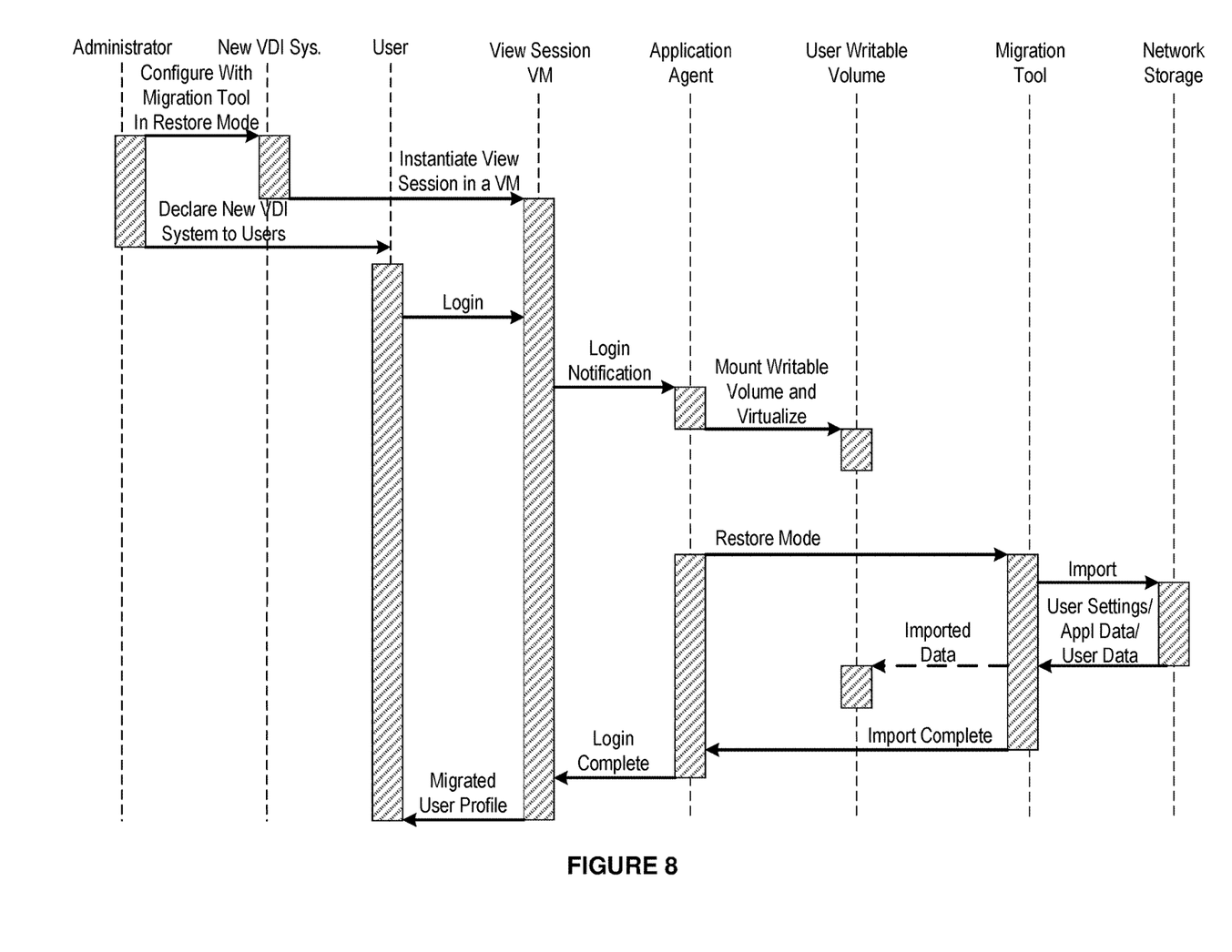
FIG. 8 is a sequence diagram illustrating steps of the user profile restore process according to one or more embodiments.

The administrator of the VDI system configures, in step 710, the new VDI system with the migration tool in restore mode, which is further described below. The new VDI environment instantiates a view session virtual machine (VM) in step 720. The administrator declares, in step 725, the new VDI system to the users.

A user logs in to the view session VM of the new VDI system in step 730, and the view session VM notifies an application agent in step 735 of the user login. The application agent mounts an application volume and a writable volume for use in the new VDI system by the user. Then in step 740, view session VM creates a new user profile, and writes the new user profile in the writable volume created for that user. The creation of the new user profile may be performed, for example, by the operating system of the view session VM.

The application agent opens the migration tool in the restore mode in step 745. Restore mode holds the user login session and executes a user profile import action, which includes requesting the user's zip file from the network storage in step 750, and then extracting user-specific data and user-defined settings from the zip file and storing them in the user's writable volume in step 755.

After the user-specific data and user-defined settings are stored in the user's writable volume, the migration tool informs application agent that the import is complete (step 765), and disables itself, so that application agent does not launch migration tool agent again on the next login by the user. In step 770, the application agent informs the view session VM of the login completion by the user. Then, in step 775, the view session VM informs the user of the migration of his/her user profile in step 775.

In some embodiments, the user may select personal information, such as information stored in a "My Pictures" or "My Documents" folder of his/her endpoint, for migration to a new VDI environment. Since a new VDI system involves the storage of user data outside of the endpoint, such as in a cloud-based VDI system, the user is given the option to select which if any of the user's personal information stored at the endpoint is to be included in the user profile to be migrated to the new VDI environment. That way, the user has control of which user information is to be migrated to the new VDI environment.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system. Computer readable media may be based on any existing or subsequently developed technology for embodying computer programs in a manner that enables them to be read by a computer. Examples of a computer readable medium include a hard drive, NAS, read-only memory (ROM), RAM (e.g., flash memory device), Compact Disk (e.g., CD-ROM, CD-R, or CD-RW), Digital Versatile Disk (DVD), magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, modifications, additions, and improvements may fall within the scope of the appended claims.

What is claimed is:

1. A method of migrating a user profile from a first computing environment to a second computing environment, wherein the second computing environment is a virtual desktop infrastructure (VDI) system, the method comprising:

in response to a user logging out of an endpoint of the first computing environment, preparing the user profile for migration by retrieving user-specific data and user-defined settings from file and registry locations of the endpoint, and exporting the user-specific data and user-defined settings to a network storage device;

in response to the user logging in to a first virtual machine (VM) of the second computing environment, mounting a first writable volume of a virtual disk of the first VM, and requesting the user-specific data and user-defined settings from the network storage device;

in response to receiving the user-specific data and user-defined settings from the network storage device, storing the user-specific data and user-defined settings in the first writable volume; and in response to launching of a first application in the first VM, reading a first settings file to determine file and registry locations of the first writable volume at which the user-specific data and user-defined settings were stored, and applying the user-specific data and user-defined settings to the first application.

2. The method of claim 1, wherein the preparing of the user profile for migration includes determining that a second application installed at the endpoint of the first computing environment corresponds to a second settings file, and the second settings file specifies the file and registry locations of the endpoint.

3. The method of claim 1, wherein the preparing of the user profile for migration includes determining that a second application installed at the endpoint of the first computing environment does not correspond to any settings files, generating a second settings file for the second application, and exporting the second settings file to the network storage device to be used during migration of a plurality of user profiles.

4. The method of claim 1, wherein the requesting of the user-specific data and user-defined settings from the network storage device and the storing of the user-specific data and user-defined settings in the first writable volume, are performed by a migration tool of the first VM.

5. The method of claim 4, further comprising:
after the storing of the user-specific data and user-defined settings in the first writable volume, disabling the migration tool, wherein in response to the disabling of the migration tool, upon the user logging in to the first VM again, the migration tool is not launched.

6. The method of claim 1, wherein the virtual disk of the first VM includes a base disk, an application volume, and the first writable volume.

7. The method of claim 6, wherein the base disk and the application volume are shared between a plurality of users of the second computing environment.

8. The method of claim 1, wherein the endpoint of the first computing environment is a physical device.

9. The method of claim 1, wherein the endpoint of the first computing environment is a second VM.

10. The method of claim 9, wherein a virtual disk of the second VM includes a base disk, an application volume, and a second writable volume, and the user-specific data and user-defined settings are retrieved from the second writable volume.

11. A computer system comprising:
a first computing environment including an endpoint, wherein the endpoint is configured to:
in response to a user logging out of the endpoint, prepare a user profile for migration by retrieving user-specific data and user-defined settings from file and registry locations of the endpoint, and export the user-specific data and user-defined settings to a network storage device; and
a second computing environment including a first virtual machine (VM), wherein the second computing environment is a virtual desktop infrastructure (VDI) system, and the first VM is configured to:
in response to the user logging in to the first VM, mount a first writable volume of a virtual disk of the first VM, and request the user-specific data and user-defined settings from the network storage device;
in response to receiving the user-specific data and user-defined settings from the network storage device, store the user-specific data and user-defined settings in the first writable volume; and
in response to launching of a first application in the first VM, read a first settings file to determine file and registry locations of the first writable volume at which the user-specific data and user-defined settings were stored, and apply the user-specific data and user-defined settings to the first application.

12. The computer system of claim 11, wherein the preparing of the user profile for migration includes determining that a second application installed at the endpoint of the first computing environment corresponds to a second settings file, and the second settings file specifies the file and registry locations of the endpoint.

13. The computer system of claim 11, wherein the preparing of the user profile for migration includes determining that a second application installed at the endpoint of the first computing environment does not correspond to any settings files, generating a second settings file for the second application, and exporting the second settings file to the network storage device to be used during migration of a plurality of user profiles.

14. The computer system of claim 11, wherein the requesting of the user-specific data and user-defined settings from the network storage device and the storing of the user-specific data and user-defined settings in the first writable volume, are performed by a migration tool of the first VM.

15. The computer system of claim 14, wherein the VM is further configured to:
after the storing of the user-specific data and user-defined settings in the first writable volume, disable the migration tool, wherein in response to the disabling of the migration tool, upon the user logging in to the first VM again, the migration tool is not launched.

16. The computer system of claim 11, wherein the virtual disk of the first VM includes a base disk, an application volume, and the first writable volume.

17. The computer system of claim 16, wherein the base disk and the application volume are shared between a plurality of users of the second computing environment.

18. The computer system of claim 11, wherein the endpoint of the first computing environment is a physical device.

19. The computer system of claim 11, wherein the endpoint of the first computing environment is a second VM.

20. The computer system of claim 19, wherein a virtual disk of the second VM includes a base disk, an application volume, and a second writable volume, and the user-specific data and user-defined settings are retrieved from the second writable volume.

\* \* \* \* \*